United States Patent
Ebner et al.

(10) Patent No.: US 11,953,453 B2
(45) Date of Patent: Apr. 9, 2024

(54) X-RAY DETECTOR DEVICE, GLASS BODY FOR SHIELDING OPTICAL DETECTOR MEANS OF A WORKPIECE MEASURING DEVICE, AND X-RAY TOMOGRAPHY WORKPIECE MEASURING SYSTEM

(71) Applicant: Intom GmbH, Stockach (DE)

(72) Inventors: Severin Ebner, Bermatingen (DE); Martin Simon, Bodman-Ludwigshafen (DE)

(73) Assignee: Intom GmbH, Stockach (DE)

( * ) Notice: Subject to any disclaimer, the term of this patent is extended or adjusted under 35 U.S.C. 154(b) by 212 days.

(21) Appl. No.: 17/418,327

(22) PCT Filed: Dec. 5, 2019

(86) PCT No.: PCT/EP2019/083768
§ 371 (c)(1),
(2) Date: Jun. 25, 2021

(87) PCT Pub. No.: WO2020/135989
PCT Pub. Date: Jul. 2, 2020

(65) Prior Publication Data
US 2022/0065800 A1    Mar. 3, 2022

(30) Foreign Application Priority Data
Dec. 27, 2018   (DE) .................... 10 2018 133 601.2

(51) Int. Cl.
*G01T 1/20* (2006.01)
*G01N 23/04* (2018.01)
(Continued)

(52) U.S. Cl.
CPC .............. *G01N 23/18* (2013.01); *G01N 23/04* (2013.01); *G01N 23/083* (2013.01);
(Continued)

(58) Field of Classification Search
CPC ...... G01N 23/18; G01N 23/04; G01N 23/083; G01N 2223/505; G01T 1/2002; G01T 1/20185
See application file for complete search history.

(56) References Cited

U.S. PATENT DOCUMENTS 3,046,148 A   7/1962  Duncan et al.
4,492,869 A   1/1985  Suzuki et al.
(Continued)

FOREIGN PATENT DOCUMENTS

DE   3141755 A1   7/1982
EP   0296737 A1   12/1988
(Continued)

OTHER PUBLICATIONS

International search report for patent application No. PCT/EP2019/083768 dated Mar. 5, 2020.

*Primary Examiner* — Kiho Kim
(74) *Attorney, Agent, or Firm* — Bachman & LaPointe, P.C.

(57) ABSTRACT

The invention relates to an X-ray detector device for industrial measurement of workpieces by X-ray, having scintillator means (12) for converting incident X-rays of the X-ray radiation passing through a workpiece being measured into visible light at a scintillator light exit surface (14), optical detector means (22; 24, 26) optically downstream of the scintillator means, for converting the visible light at the scintillator light exit surface into an electronic image signal, and X-ray protection means (18, 20; 18', 20'; 18", 20") which are provided in an optical beam path between the scintillator means and the optical detector means and have a body, in particular a glass body, that is transparent to visible light and has X-ray absorbing properties.

17 Claims, 2 Drawing Sheets

(51) Int. Cl.
*G01N 23/083* (2018.01)
*G01N 23/18* (2018.01)

(52) U.S. Cl.
CPC ........ *G01T 1/2002* (2013.01); *G01T 1/20185* (2020.05); *G01N 2223/505* (2013.01)

(56) References Cited

U.S. PATENT DOCUMENTS

| | | |
|---|---|---|
| 4,593,400 A | 6/1986 | Mouyen |
| 8,872,116 B2 | 10/2014 | Koren et al. |
| 2003/0087744 A1 | 5/2003 | Komori et al. |
| 2009/0196399 A1* | 8/2009 | Schmitt ................. G01T 1/2002 |
| | | 378/145 |
| 2013/0026375 A1* | 1/2013 | Svenonius ........ H01L 27/14663 |
| | | 250/361 R |
| 2016/0351283 A1* | 12/2016 | Adler ...................... H01L 22/12 |

FOREIGN PATENT DOCUMENTS

| | | |
|---|---|---|
| JP | 11352230 A | 12/1999 |
| JP | 6179362 B2 | 8/2017 |
| WO | 2011015357 A2 | 2/2011 |
| WO | 2014000810 A1 | 1/2014 |

\* cited by examiner

X-RAY DETECTOR DEVICE, GLASS BODY FOR SHIELDING OPTICAL DETECTOR MEANS OF A WORKPIECE MEASURING DEVICE, AND X-RAY TOMOGRAPHY WORKPIECE MEASURING SYSTEM

BACKGROUND OF THE INVENTION

The present invention relates to an X-ray detector device. Furthermore, the present invention relates to a glass body for shielding optical detector means of an industrial workpiece measuring device, and the present invention relates to an X-ray-tomographic workpiece measuring system.

Generic X-ray detector devices as an essential measuring component (and testing component, hence used synonymously) of industrial workpiece measuring systems according to the preamble of the main claim are commonly known from the state of the art and are used for a plurality of (industrial) measuring purposes, wherein especially the automated manufacturing technologies of workpieces (to be tested), including additive manufacturing technologies, which are being continuously developed and are gaining popularity, offer various other future applications of such technologies.

In particular, generic X-ray testing systems are characterized in many industrial branches by their property of being capable of characterizing, testing and measuring inner structures (i.e. structure not visible by simple external observation), including hidden defects, which bears the potential of being able to integrate such activities into a production process, in particular in automated systems. In this context, the scope of workpiece measuring by means of X-ray radiation is wide and ranges from projective 2D X-ray methods for simply structured components ("workpieces") to tomographic methods for more complex workpieces.

In all these (industrial) workpiece measuring technologies using X-ray radiation, there is demand for a shortest possible testing time with the purpose of being able to adapt testing times and related times for quality control to increasingly short cycle times of associated industrial manufacturing processes. Additionally, a short testing time is a cost factor in particular with regard to the costs to be allocated to the individual workpiece to be tested.

A common measure for shortening a workpiece measuring time in the X-ray context is to increase the output of the X-ray emitter (X-ray radiation source) since the testing time typically decreases when the X-ray output is increased. Additionally or alternatively, the measuring or testing time can be reduced by lowering the distance between the X-ray source and the X-ray detector device, thereby increasing the ray density (to be detected) on the X-ray detector device by the square of the decrease in distance.

However, such an increase in radiated X-ray power or in radiation density also leads to a higher radiation exposure of the components subjected to the radiation in a generic X-ray workpiece measuring system, in particular of the modules of the X-ray detector device, which itself is composed of what is referred to as the scintillator means for converting incident X-rays into visible light and of optical detector means, at which visible light is ultimately converted into an electronic image signal. The relatively low radiation resistance of the optical detector means, which are typically realized by means of semiconductor material in CCD or CMOS technology, is especially problematic in this regard. The interaction of the X-ray photons that are not converted into visible light in the scintillator means (and pass them without being converted instead; this proportion can be greater than 80% and even up to 95% and higher depending on the scintillator material used) leads to harmful interaction with said X-ray photons in the semiconductor material, which might potentially destroy the detector. Hence, it is quite common especially for optical detector means of industrial X-ray based workpiece measuring systems that are operated continuously to be replaced several times a year, which leads to immense costs of the X-ray workpiece measuring process realized in this manner.

In order to reduce the described residual X-ray radiation inadvertently passing through the optical detector means and entering the scintillator means, it can be considered generally known for a glass body having X-ray-absorbing properties while being transmissive to visible light to be inserted into this ray path as an X-ray protection means; traditionally, lead glass cut into a disk shape is used for this purpose.

However, this approach is not ideal either and additionally poses significant problems in terms of optimization and efficiency: for instance, the X-ray absorption in glass bodies of this kind leads to disadvantageous degradation effects of such a nature that the transmissivity for visible light decreases over the course of operation (referred to as browning, an unwelcome discoloration especially of lead-containing glass bodies, for example, by X-ray radiation). However, this very degradation reduces the amount of visible light (to be ultimately detected by the optical detector means), necessary light exposure times (and therefore measuring cycles) in turn becoming longer contrary to the original intention. This loss of efficiency can be immense depending on the radiated X-ray output or a dose introduced into the material of the X-ray protection means. Moreover, this disadvantageous degradation would again have to be counteracted by replacement and maintenance measures, which further burden the measuring process.

A possible alternative solution for preventing inadvertent X-ray introduction into the optical detector means entails placing said optical detector means themselves outside of the X-ray path and deflecting the visible light in the direction of the thus displaced optical detector means by means of light-guiding elements. As an example, WO 2011/015357 A2 hints at such an option; in addition to a higher complexity of the machinery and the construction, however, this bears the disadvantage of a possible distortion of the image or the perspective of the resulting image signal generated by the optical detector means due to the necessary light deflection.

Aside from the discussed issues regarding output, time and degradation, the application context of industrial X-ray workpiece measuring described as generic in the context of the state of the art in the preamble additionally poses other related challenges and potential for optimization: for instance, the residual X-ray radiation passing through the scintillator in converted form as described adversely affects the optical detector means (more precisely, their semiconductor sensor elements); moreover, further scattering of said residual X-ray radiation on inner housing walls of an X-ray protection housing surrounding the entire measuring device leads to image defects (in particular visible as fog in resulting images), wherein said scatter next to or behind the detector means, for example, is reflected back in the direction of the scintillator and can lead to the image defects described. Also, scattered radiation occurs in the area of the visible light by (inadvertent) reflection and scattering, in particular when fiber-optic plates and bodies for light guiding are used.

Finally, a general issue of generic industrial X-ray measuring technology consists in the bulkiness, the high weight and the accompanying low mobility of such systems. Particularly the necessity of fully shielding the system for the X-ray radiation generated and projected has the result that an X-ray protection housing surrounding the entire arrangement is bulky and heavy (and additionally causes high material-related manufacturing costs) especially because of the necessary use of lead plates and similar shielding technology.

SUMMARY OF THE INVENTION

Hence, the object of the present invention is to provide an X-ray detector device which allows high radiation densities of the X-ray radiation to be used at potentially short distances from the radiation source in order to overcome the disadvantages described above, thereby shortening an effective measuring time (in particular also for the high number of successive individual measuring processes necessary in tomographic methods) and permitting high detail resolution and therefore high image resolution. Furthermore, the object is to provide an X-ray-tomographic workpiece measuring system, in particular using such an X-ray detector device, which combines the advantages regarding operation, resolution, output and speed with a more compact and lighter (and therefore potentially mobile) design, which offers the potential of also opening new fields of application for industrial X-ray workpiece measuring technology.

The object is attained by the X-ray detector device having the features disclosed herein; advantageous embodiments of the invention are also described herein and in the dependent claims. Furthermore, protection within the scope of the present invention is claimed by the glass body as disclosed herein, which is preferably intended for use in the X-ray detector device disclosed herein but shall also be deemed an invention independent thereof. Furthermore, protection within the scope of the invention is claimed for the X-ray-tomographic workpiece measuring system as disclosed herein, which is preferably intended for use with the X-ray detector device disclosed herein but shall also be deemed an invention independent thereof. Finally, all aspects and method steps of a method for industrial measuring of a workpiece by means of X-ray radiation that relate to the operation of at least one of the mentioned products identified as part of the invention and that are apparent from the present documents are considered to be disclosed within the scope of the present invention.

In an advantageous manner according to the invention, the X-ray detector device disclosed herein provides the general option of removing the optical detector means that are vulnerable to parasitic X-ray radiation from the (primary) X-ray path by means of deflection means, whereas essential embodiment examples for the realization of the invention place the optical detector means in the immediate ray path downstream of the scintillator means without any deflection. However, the invention advantageously provides that the X-ray protection means provided between the scintillator means and the optical detector means can be provided with or influenced by two measures which can each have individual effect or act accumulatively and which represent significant progress compared to the generic state of the art:

First, the invention provides for the body forming the X-ray protection means and transmissive to the visible light to be composed of multiple sheets or multiple layers. These sheets or layers differ in terms of their X-ray-absorbing properties and their resistance to degradation in that a first sheet or layer, which faces the scintillator means, presents an improved X-ray absorption capacity and/or a higher material degradation resistance (relative to a second sheet or layer, which is disposed downstream thereof and faces the optical detector means).

In the context of the invention, the term "layer" means a layer of a layered body (i.e., a body having a structure composed of adjacent layers). Hence, the realization of the invention in the form of the first and second layers provides that these two layers form the layer structure in a consecutive manner, i.e., by being in contact with each other. By contrast, the term "sheet" as used in the context of the invention means that there are also (typically flat and plane) body sections in the form of the first and second sheets, which, however, do not have to be immediately adjacent to, in contact with or connected to each other; instead, the first and second sheets according to the invention can also be realized in such a manner that these sheets are spaced apart from each other and may additionally have optical means interposed.

The term "body" within the meaning of the invention does not necessarily mean a one-piece and/or monolithic body; in the case of the preferred glass body, for example, said glass body is not necessarily limited to a monolithic realization by means of amorphous silicate material. Instead, a suitably light-guiding body realized as a rigid assembly of light-guiding fibers is also considered a body or a glass body according to the claims. Assemblies of this kind are known in optics as fiber-optic plates or as fiber-optic tapers if they present widened or tapered surface ratios.

"Degradation" and "material degradation" within the meaning of the invention include effects with regard to the X-ray protection means that adversely affect their transmission properties for visible light including (but not limited to) what is known as browning and effects that are referred to as "activation of color centers" and relate to a shift of the valence electrons of the atoms.

Against this background, the invention teaches dimensioning or parameterizing the body to be composed of multiple sheets or multiple layers (according to the chosen material) in terms of its respective sheets or layers in such a manner that the first sheet or layer (which faces the scintillator means) absorbs more X-ray radiation and/or is more resistant to the material degradation than the second sheet or layer, which is disposed optically downstream (and thus faces the optical detector means).

For the practical implementation, this advantageously means that the X-ray protection means body can be optimized with respect to the residual X-ray radiation (penetrating the scintillator means in an unwelcome manner): The first (more resistant) layer (sheet) already absorbs a significant portion of the radiation dose to be absorbed. However, the material properties advantageous in this regard optimize this absorption step. At the same time, it is possible for the first sheet (layer), which typically has inferior transmission properties for the visible light, to be designed thinner than the second sheet (layer), which means that these transmission advantages do not have too great an effect (and advantages in terms of cost can be additionally realized through less material consumption of the—expensive—resistive glass). Technical measures for increasing a resistance of a glass material (and of fiber-optic structures) to material degradation are known as such; reference is made to U.S. Pat. No. 3,046,148 and US 2003/0087744 A1 as examples, which each disclose glass technologies for preventing or reducing the browning.

On the other hand, the second sheet (layer) can be optimized with regard to its X-ray absorption properties, the resistance to degradation and the transmission properties for visible light (in combination with the first sheet/layer, which is disposed upstream) in such a manner that radiation entering the second layer (sheet) is still absorbed there to a significant degree but does no longer lead to severe discoloration (referred to as a level effect; the perceived effect that the spectrum of the X-ray beam changes as well as its density probably also plays a role here). By dimensioning the thickness of said second layer (sheet) accordingly, it can even be advantageously achieved that virtually no X-ray photons occur at the optical detector means disposed downstream, which means not only that an almost ideal protection for the vulnerable detector semiconductors is ensured but also that the X-ray scatter effects described above and known as disadvantageous from the state of the art virtually cannot occur any more.

With this advantageous effect, the problem of increased radiation introduction (accompanied by an equivalently shortened measuring time) underlying the invention can be solved in a surprisingly simple and elegant manner at optimized degradation behavior.

This first solution aspect is directly related to the second solution approach according to the main claim, according to which the body forming the X-ray protection means is assigned regeneration means which are configured to introduce short-wave light radiation in the visible spectrum and/or UV radiation into the body and can thereby prevent X-ray-related material degradation.

This measure initially has a synergetic effect in combination with the first measure described above, namely that in particular the first sheet (layer) affected by the degradation can be treated by the regeneration means according to the invention, potentially even without having to change the overall assembly (by removal or replacement of the body or parts thereof, for example). According to this embodiment of the invention, this measure is effective both in a purely regenerating mode outside of a regular workpiece measuring mode of the X-ray detector device and simultaneous to such a measuring mode. In this regard, it has proven advantageous within the scope of the invention, for example, that the radiation introduction according to the invention for reducing the material degradation can take place virtually unaffected by the simultaneously running irradiating and transmitting process of the X-ray radiation.

Thus, the present invention offers the option of creating an (ideally) virtually maintenance-free system for the material degradation of the X-ray protection means whose advantages regarding efficiency, maintenance effort, maintenance and replacement time required, and potential maintenance and replacement costs for bodies (and the optical detector means) are evident.

In advantageous embodiments according to the invention, numerous variations for implementing the principle of the invention described above can be realized:

Regarding the body realized as a layer assembly according to the invention, it is advantageous and preferred for the first and second layers to be provided adjacent to each other (wherein the body is not limited to only two layers according to the invention—there can be more layers of such a layer structure); regarding the body conceptualized as an interaction of the first and second sheets (which are not limited to only two sheets either), however, it is alternatively possible for the first and second sheets to be provided at a spatial distance from each other. Accordingly, compact monolithic bodies can be designed as a layer assembly, to which the scintillator means can even be added at one end and the optical detector means (in the shape of a common semiconductor array, for example) can even be added at the other (opposite) end. Thus, as a spatially distributed assembly of sheets, the variation of the invention offers nearly infinite options of how to place the respective modules in a suitable geometric manner, thereby optimizing the widths (surface extensions) required in each case or being able to take into account any desired specifics of the detector technology, such as the provision of digital cameras including associated lenses.

In particular when the first sheet or layer is realized in association with the scintillator means, it is possible for them to be designed as separately replaceable wear parts or the like, such as in the context of simplified systems without the associated regeneration means.

According to another advantageous embodiment, it may be advantageous for at least one outer or inner boundary surface of the body (i.e., one sheet or layer) to be provided with an antireflective coat which is effective in particular in the spectrum of visible light. This measure additionally improves the imaging properties of the invention since potentially interfering reflections of visible light can be effectively prevented with little effort.

Within the scope of the present invention, it is also possible in principle to realize the layer structure according to the invention including the first and second layers without a (physical) interface by providing a first portion of the body with the material properties characterizing said portion as the first layer by melting or diffusion or other technologies for local material modification, for example, while another (a remaining) portion is either not treated additionally or differently so as to realize the second layer. The diffusion of lead, barium, strontium or similarly effective elements into the body is suitable for such a material modification, for example.

The present invention also offers numerous variations and advantages with regard to the realization and/or the connection of the optical detector means. For instance, cost-efficient and high-resolution realizations of the optical detector means in particular make it possible for the latter to be realized by means of a digital camera and optics disposed upstream thereof. If the second sheet according to the invention is provided (directly) on this lens in this case, the module area required can be optimized; additionally, this advantageous embodiment of the invention allows the camera device to be provided at a given desired geometrical position (relative to the scintillator means and to the first sheet of the body), wherein additional deflection means, such as in the form of common mirrors, may be provided (which may be additionally modified or optimized in terms of their absorption properties for X-rays).

Although, in principle, the present invention permits the X-ray protection means in the form of the body to be protected directly by the associated regeneration means and the material degradation to be continuously counteracted by the regenerating radiation introduction, it is still envisaged within the scope of the invention for the respective body modules to also be replaceable or exchangeable independently, i.e., separately, from each other. This applies in particular to the case in which they are provided separately from each other in the form of the first and second sheets. In this case, replacement handling means according to an embodiment can be provided, which are manually or automatically operable and enable replacement or retooling with little effort and in a potentially time-saving manner depending on the degree of degradation or on requirements for a given measuring task.

With regard to the variation of a simultaneous regeneration technology, i.e., a regeneration technology integrated into the X-ray detector device according to the invention, it has proven particularly advantageous that while the shortwave visible light radiation or the UV radiation according to the invention effectively reduce or alleviate the material degradation in the X-ray protection body, the optical detector means according to the invention do not have a spectral sensitivity in this range when common CMOS sensor are used, for example. In other words, even an operation of these additional radiation sources, which are provided at the edge of the body according to an embodiment, simultaneous to the X-ray measuring operation (with active optical detector means) does not generate interference during the generation of the electronic image signal while the degradation-curing effect on the X-ray protection means exists at the same time. According to another embodiment, it has been found advantageous for said radiation source to be realized in the form of (short-wave) LEDs, wherein even UV-emitting LEDs are available and employable.

While the sheets and layers according to the invention for realizing the X-ray protection means can moreover commonly each be configured as one surface, i.e., extend across an entire transverse dimension, embodiments of the invention nevertheless comprise that these material sections are provided as multiple segments which are suitably joined. Likewise, the optical detector means, which are advantageously realized as a camera, can also be realized as a plurality of camera modules (suitably directed at parts of the ray path, for example), which can also be suitably staggered or overlap and/or be provided with different individual resolutions in a variation.

The present invention is implemented in a particularly elegant fashion in an X-ray-tomographic workpiece measuring system if the option of making the output side of the X-ray protection means (the X-ray protection body) virtually free from X-ray photons offered by the invention as described above is used, i.e., if the X-ray protection body is configured (by the means of the present invention, for example) in such a manner that it can effectively define an X-ray radiation protection space and can thereby itself become part of the X-ray protection housing.

This advantageously allows an X-ray-tomographic workpiece measuring system designed according to the invention to be of a compact and light-weight design since this optimization has the effect that the protection or containment area of the X-ray protection housing only has to extend from the X-ray source (or from around the X-ray source) to the X-ray protection means downstream of the scintillator means but not to the optical detector means. Depending on a geometrical design in the area of the visible light, considerable weight and costs can be saved in this case, and the flexibility, the modularity and the mobility of a system designed according to the invention increase significantly.

These positive effects are additionally amplified by the associated technical measure of providing the units taking part in the actual measuring process, i.e., the X-ray source on one side, the optical detector means on the other side, and interposed workpiece support means, on a common continuous support unit so as to preclude potentially negative vibration interferences from the X-ray protection housing itself. In this case, the scintillator means typically ought to also be installed on the support means, in which case the latter extends from the X-ray-protected area (X-ray source, workpiece support, scintillator) through a (X-ray-protected but still decoupled) opening in the surrounding X-ray protection housing to the detector area, which is not X-ray-protected. In this implementation, the X-ray protection means (composed of two layers, for example) would form the window-like wall portion of the protection housing affected by the X-ray output. However, this invention is also conceivable and possible with simpler X-ray-absorbing bodies, such as single-layer or single-sheet (glass) bodies.

As a result, the present invention allows the radiation, shielding, degradation and distance conditions in an X-ray workpiece measuring system to be optimized in such a manner that operating properties can be significantly improved by higher output and potentially shorter distances and that degradation can be effectively prevented or optimized or efficiently subjected to suitable corrective measures in a surprisingly simple and elegant fashion. This can result in a significantly more compact, lighter and more mobile system which makes X-ray-tomographic measuring technology available for entirely new and sophisticated applications.

BRIEF DESCRIPTION OF THE DRAWINGS

Other advantages, features and details of the invention are apparent from the following description of preferred embodiment examples and from the figures.

DETAILED DESCRIPTION

Figure 1:
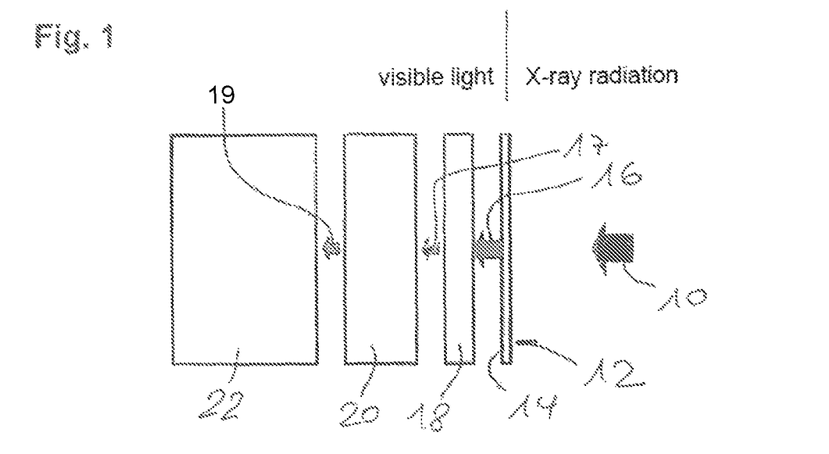
FIG. 1 is an exploded view schematically illustrating the X-ray detector device according to a first embodiment example of the invention.

The schematic section view of FIG. 1 shows both a first embodiment example and the basic functionality of the invention in realizing the X-ray detector device according to the invention: X-ray radiation from an X-ray source (not shown in detail) penetrates the workpiece to be measured (not shown either) and strikes a plane scintillator 12 at high intensity (arrow 10). Scintillator 12 first generates an image of the radiographed workpiece at its scintillator light exit surface 14 by converting the incident X-ray photons into visible light. At the same time, unconverted residual X-ray radiation penetrates scintillator 12.

The radiation of visible light 16 reaches a two-layer glass body 18, 20 (X-ray protection means), wherein both first layer 18 and second layer 20 are each realized as what is known as fiber-optic plates which differ in their resistance to X-ray radiation degradation and transmissivity for visible light. X-ray protection means 18 and 20 are followed by optical detector means 22 in the form of a CMOS detector, wherein further arrows 17 (between layers 18 and 20) and 19 (in front of sensor 22), which illustrate the intensity of the visible light, show that second layer (sheet) 20 effects basically no significant further attenuation of the visible light. At the same time, the intensity of the (parasitic) X-ray radiation decreases to a harmless level.

In the specific realization and for a typical output of an X-ray radiation source (not shown in FIG. 1) of 300 W (having a focal spot size of 200 µm, for example), a glass body layer of a typical thickness of 3 mm would be selected for first layer 18, such as one of the type Schott Fiber Optic Faceplate 47 ARH; the transmission for visible light is about 70%. For second layer 20, on the other hand, a less degradation-resistant glass body layer of a thickness of about 8 mm would be selected, which permits about 85% transmission of visible light, for example (each with respect to a wavelength of 550 nm in the case at hand). A fiber-optic plate of the type Schott Fiber Optic Faceplate 47 A HAT A would be a suitable material for second layer 20; alternatively, layers 18 and/or 20 can also be formed by suitably parameterized glass plates or other (monolithic) bodies.

When installed in practice, respective plates and layers 14, 18, 20 and 22 are in contact with each other; according to an advantageous embodiment, a coupling medium (such as oil or epoxy resin) for adapting the refractive indices can optionally be provided in the transitions between these components.

As becomes clear, the assembly shown reduces residual parasitic X-ray radiation (not converted into visible light) to a minimum harmless to sensor 22, while the level of visible light from exit surface 14 of the scintillator is attenuated by (relatively thin) first layer 18 but can subsequently pass through the other X-ray protection layer 20 to sensor 22 nearly attenuated.

Figure 2:
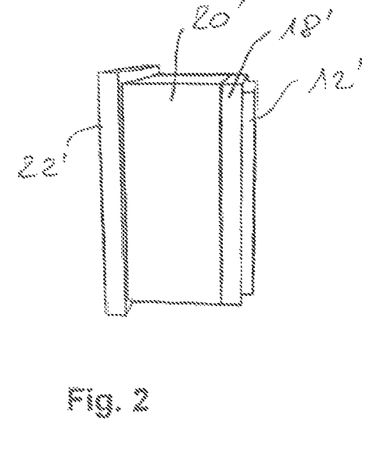
FIG. 2 shows a second embodiment example of the X-ray detector device according to the invention using fiber-optic plates to form the first and second layers.
Figure 3:
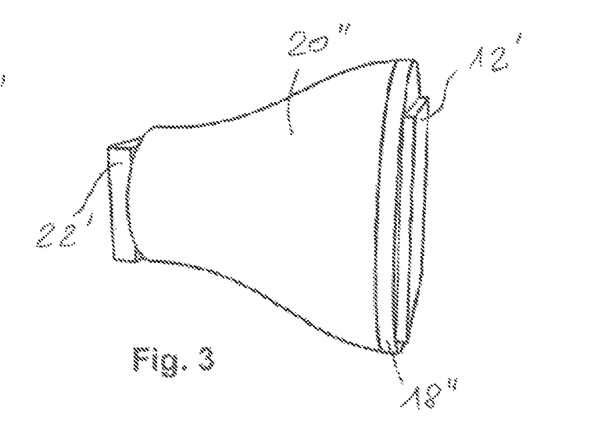
FIG. 3 shows a variation of the embodiment example of FIG. 2, the second layer being formed by a fiber-optic taper having a reduced optical output surface.
Figure 4:
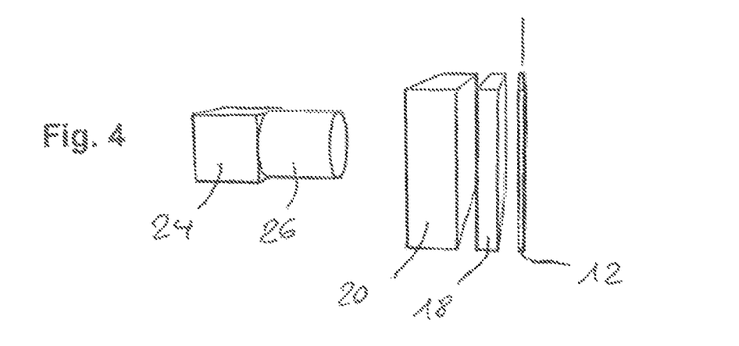
FIG. 4 shows a third embodiment example of the invention, in which the optical detector means (image sensor) are formed by a digital camera having an associated lens.

FIGS. 2 and 3 show geometrical variations of this principle in different configurations; more extreme thickness ratios of first layer 18 relative to second layer 20 are visible. In embodiments within the scope of the present invention (and also beyond the specific embodiment examples), thickness ratios of the first layer (here: 18) relative to the second layer (20) between 0.1 and 0.3 are advantageous; in industrial applications, a ratio between approx. 0.18 and approx. 0.22 has proven particularly favorable.

While the embodiment example of FIG. 2 does not show a 1:1 coupling of scintillator 12' with CMOS sensor 22' (fiber-optic plates 18' and 20' in the layer assembly transmit this image resolution accordingly), the taper geometry of second layer 20" in FIG. 3 in particular illustrates how the size of scintillator 12' (according to FIG. 2) is mapped onto a relatively smaller (and therefore higher-resolution) sensor surface of detector means 22". According to the larger entry surface of second layer 20", first layer 18", which is disposed upstream, has a larger circular shape. In this case, too, the layer structure can be optically supported by a coupling medium as described above, for example, if needed.

FIGS. 4 to 7 show different options of how to realize the optical detector means using a digital camera/lens assembly 24, 26 and deflect the ray path of the visible light, i.e., dispose the multiple sheets or layers of X-ray protection means in the ray path. For instance, the embodiment example of FIG. 4 initially uses the basic layered or stacked arrangement of FIG. 1; however, the immediately adjacent CMOS image sensor, which serves as the optical detector means, is replaced with camera/lens assembly 24, 26. The distance between lens 26 and scintillator 14 is determined by the working distance of lens 26. Instead of a layered arrangement, modules 20 and 18, when realized as sheets, (and scintillator 12) can each be spaced apart, and intermediate media for adapting refractive indices or the like can be provided again, if desired. In particular a distance between sheets 18 and 20 allows surfaces affected by light and X-ray radiation penetration to be (entirely or selectively) provided with finishes or antireflective coatings in order to thus improve the optical properties.

Figure 5:
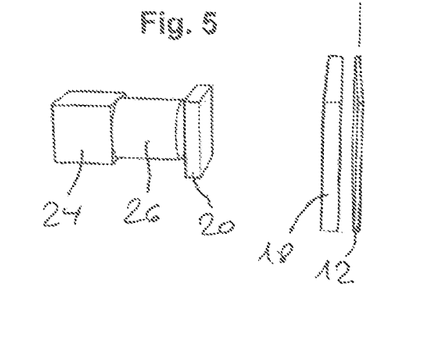
FIGS. 5-7 show variations of said third embodiment example, in which the second sheet of the X-ray protection means is provided on the camera or on the first sheet and a deflection mirror is selectively looped into the ray path of visible light.
Figure 6:
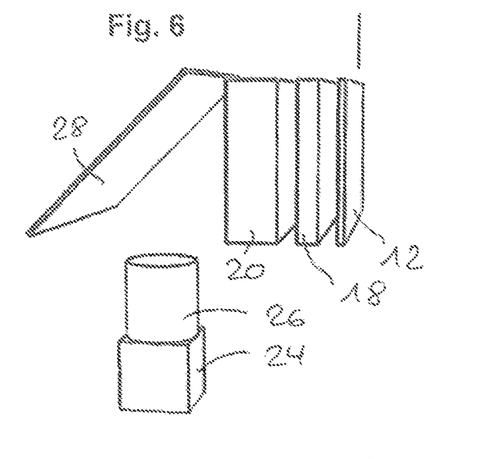
Figure 7:
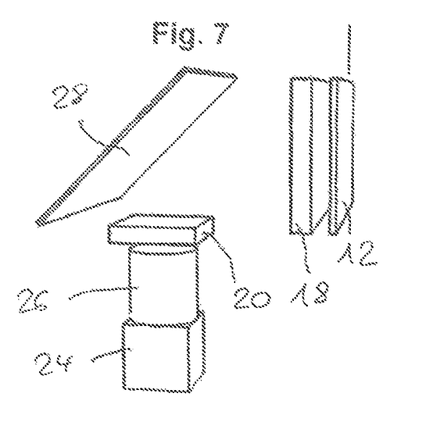

Corresponding configuration and variation options also apply to FIGS. 5 to 7. For instance, FIG. 5 illustrates that when second sheet 20 is shifted to lens 26, the surface size required therefore (and determined by the width and height of the extension perpendicular to the ray path) can be significantly reduced. FIG. 6, on the other hand, provides a deflection mirror 28, which achieves a possible shortening of the structural length in the rearward direction (i.e. on the left in the drawing plane). Moreover, additional radiation protection for camera/lens assembly 24, 26 is realized in this case since the effect of the deflection mirror 28 allows the camera to be placed outside of an X-ray path. Also, the deflection mirror technology (which itself can also be provided with an effect attenuating X-ray radiation) has a positive effect on disadvantageous scattered (X-ray) radiation since the latter can basically no longer reach scintillator 12 (again); if it is scattered in a backward direction at all, it is absorbed by modules 18, 20. FIG. 7 shows a combination of the invention idea of FIG. 5 and FIG. 6.

Figure 8:
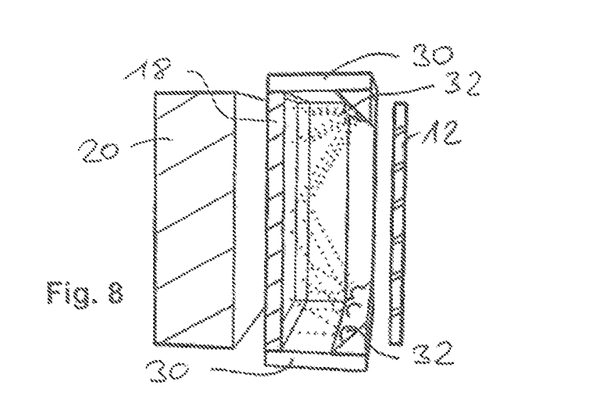
FIG. 8 is a detail view illustrating an aspect of the invention according to which the X-ray protection means (the first layer or sheet in this case) are assigned regeneration means in the form of radiation sources for short-wave or UV-radiation.

FIG. 8 illustrates an example of how the regeneration means according to the invention, which are assigned to the X-ray protection means, can be realized in practice: a frame support structure 30, which is assigned to first sheet (layer) 18 in the case at hand and provided in an edge area of layer 18, supports a plurality of LED radiation bodies 32 in such a manner that they radiate UV radiation and/or light radiation in the short-wave visible range onto the entry surface of module 18 on the side of the scintillator (12) or introduce said radiation into body sheet 18, which has the effect that said radiation compensates or reduces any degradation of body sheet 18 having been caused or being caused by X-ray radiation. As can be seen from the schematic illustration of FIG. 8, the radiation of radiation source 32 primarily acts on first sheet 18 in the embodiment example shown, while second (thicker) sheet 20 is unaffected; however, the latter is also less affected by degradation owing to the invention.

Advantageously, the regenerating irradiation shown does not affect a passage of visible light (i.e. of the useful signal) through the layer assembly, which means that the shown measure can also be executed simultaneously to an X-ray measuring operation, in particular if a spectral distance between the sensitivity of the optical detector means (not shown in FIG. 8) and the radiation emission of radiation source 32 is set.

Figure 9:
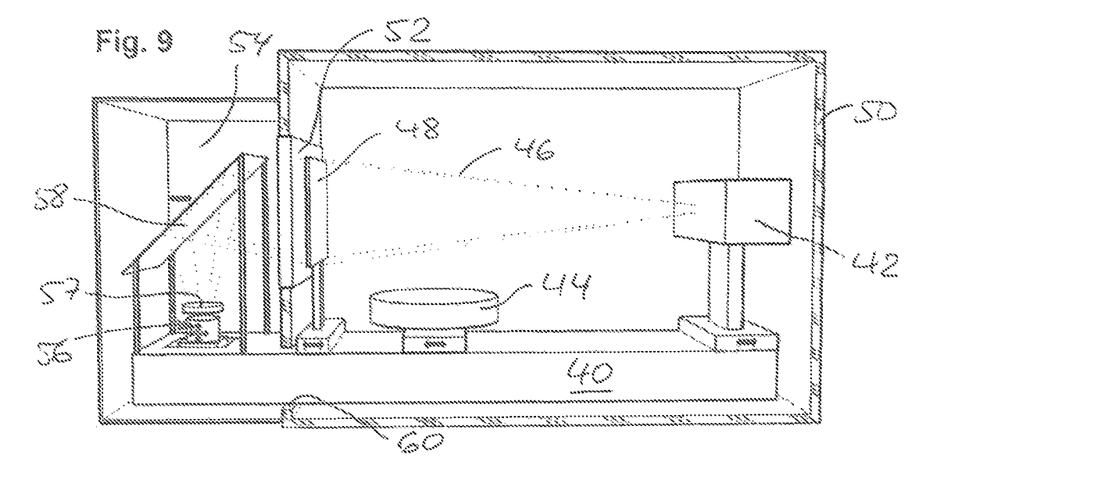
FIG. 9 is a schematic side view illustrating a possible overall context of the invention as an X-ray-tomographic workpiece measuring system having a reduced X-ray protection area.

FIG. 9 shows the X-ray detector technology described above in the overall context of an X-ray-tomographic workpiece measuring system; additionally, a potentially independent aspect of the invention is also embodied in FIG. 9: an X-ray source 42, which has the properties described above, for example, is installed at one end of a support body 40, which usually extends horizontally when in the installed state. Along the support extension, said X-ray source is followed by workpiece support means 44 (realized as a raisable turntable in the case at hand), which are disposed in such a manner that they can be longitudinally displaced in the manner shown by the respective double arrows, as are X-ray source 42 and scintillator means 48, which are disposed downstream in X-ray path 46. This X-ray area between X-ray source 42 and scintillator means 48 is enclosed by an X-ray protection housing 50 (symbolized by the triple hatching), which is formed by lead plates and is limited by a window portion 52 as part of a side wall of housing 50 in the left area of FIG. 9, window portion 52 being transparent to visible light. A receiving space 54 for receiving optical detector means 56 is located to the left of said window portion 52, optical detector means 56 being schematically displaceable along the double-arrow arrangement, being formed by a digital camera/lens assembly and being exposed to light passing through window 52 via a deflection mirror 58. Housing 50 or, more precisely, window assembly 52 has the effect that the area outside of housing 50 and therefore in particular also receiving space 54 for the image capture means are free from X-ray radiation.

While it is possible and favorable for window assembly 52 in FIG. 9 to be configured as, for example, a layer assembly of a first layer 18 and a second layer 20 (such as according to FIG. 1 of the first embodiment example) according to preferred embodiments of the invention, it is not necessary in order to realize this aspect of the invention; in principle, a single-layer assembly of a glass body or a similar X-ray protection means would suffice for realizing window 52. Also, the specific realization example of FIG. 9, for example, shows how a part of the X-ray protection body in the form of sheet 53 is provided directly in front of camera/lens assembly 56, thus corresponding to the principle of FIG. 7. This also means that receiving space 54 does (not necessarily) have to be entirely free from X-ray radiation; instead, the invention provides that an appropriate reduction of X-ray radiation outside of housing 50 is achieved depending on the requirements and the given measuring or testing purpose.

It is further visible how support unit 40 firmly connects all units vulnerable to vibrations and taking part in the X-ray measuring process of a workpiece to be supported on turntable 44. Hence, the housing (which itself poses a vibration risk) is vibration-decoupled from support unit 40 at the area of transition 60 to support unit 40, while radiation protection (or an impermeability to that effect) is ensured.

It is also visible how the invention allows the housing, which determines the volume and the weight of the system, to be significantly reduced in size (and therefore in weight) through an assembly according to FIG. 9, with has the advantageous consequence that production costs could sink and the flexibility outside of window 25 in processing the light signal passing through is immensely improved without potential risk from X-ray radiation and that the mobility and the portability of such a device are significantly increased without a loss of stability or vibration protection.

The invention claimed is:

1. An x-ray detector device for industrial workpiece measuring by means of X-ray radiation, the x-ray detector device comprising
scintillator means (12) for converting incident X-rays of the X-ray radiation penetrating a workpiece to be measured into visible light at a scintillator light exit surface (14), optical detector means (22; 24, 26) for converting the visible light at the scintillator light exit surface into an electronic image signal, the optical detector means being disposed optically downstream of the scintillator means
and X-ray protection means (18, 20; 18', 20'; 18", 20") disposed in an optical ray path between the scintillator means and the optical detector means and comprising a body which is transmissive to visible light and has X-ray-absorbing properties, wherein the body is a glass body,
wherein
the body is composed of multiple sheets and/or multiple layers, its material is selected in terms of X-ray absorption, transmission of visible light and resistance to material degradation, and its thickness is dimensioned in such a manner that a first sheet or layer (18; 18'; 18"), which faces the scintillator means, has greater X-ray-absorbing properties and/or a higher resistance to material degradation by the X-ray radiation than a second sheet or layer (20; 20'; 20"), which is disposed optically downstream of the first sheet or layer and faces the optical detector means,
and/or
the body is assigned regeneration means (30, 32) capable of introducing short-wave visible light radiation and/or UV radiation into the body to reduce X-ray-related material degradation in the body.

2. The device according to claim 1, wherein the first and second layers form the body as an adjacent layer arrangement.

3. The device according to claim 1, wherein the first and second sheets form the body as a spatially separate arrangement.

4. The device according to claim 3, wherein the optical detector means are realized as a digital camera device (24) having a lens (26) disposed upstream, and the second sheet is provided on the lens.

5. The device according to claim 3, wherein the first sheet is replaceable and/or exchangeable separately from and/or independently of the second sheet.

6. The device according to claim 5, wherein the first sheet has replacement handling means assigned thereto which are configured for manual or automated operation.

7. The device according to claim 1, wherein the first sheet or layer is adjacent to the scintillator light exit surface, and at least the first sheet or layer forms a replaceable unit and/or module with the scintillator means.

8. The device according to claim 1, wherein at least one outer or inner boundary surface of the body is provided with an additional coating which is anti-reflective in the visible light spectrum.

9. The device according to claim 1, wherein optical deflection means (28) are looped into the ray path between the first sheet or layer and the optical detector means in such a manner that an optical axis of the optical detector means forms an angle >0 to an axis of the X-ray radiation incidence onto the scintillator means.

10. The device according to claim 9, wherein the optical deflection means (28) are looped into the ray path between the first sheet or layer and the optical detector means in such a manner that an image sensor of the optical detector means is located outside of a radiation area of the X-ray radiation.

11. The device according to claim 1, wherein an array of radiation sources (32) for short-wave light and/or UV radiation is coupled to the body at an edge in such a manner that radiation can be introduced into a side of the body during a workpiece measuring operation of the X-ray detector device and/or independently of said operation.

12. The device according to claim 11, wherein the side is a flat side.

13. A glass body for shielding optical detector means of an industrial workpiece measuring device from X-ray radiation penetrating scintillator means of the measuring device, wherein the glass body is composed of multiple sheets and/or multiple layers, its material is selected in terms of X-ray absorption, transmission of visible light and resistance to material degradation, and its thickness is dimensioned in such a manner that a first sheet or layer has greater X-ray-absorbing properties and/or a higher resistance to material degradation by the X-ray radiation than a second sheet or layer, which is disposed optically downstream of the first sheet or layer.

14. The glass body according to claim 13, in combination with an X-ray detector device according to claim 1.

15. X-ray-tomographic workpiece measuring system comprising a radiation source (42), and an X-ray detector device, comprising scintillator means (48) and optical detector means (56) disposed downstream thereof, an X-ray radiation area between the X-ray source and the scintillator means provided at or on the support device being surrounded by an X-ray protection housing (50) in a manner providing protection against radiation, wherein a transmission area of visible light between an X-ray protection body (52), which is made of glass, transmissive to visible light and disposed optically downstream of the scintillator means, as a wall portion of the X-ray protection housing and the optical detector means (56) is at least partially located outside of the protection and/or containment area defined by the X-ray protection housing.

16. The system according to claim 15, wherein the support device (40) extends through the X-ray protection housing (50) in an X-ray-proof manner and in a manner decoupled therefrom mechanically and/or in terms of vibrations.

17. The system according to claim 15, wherein the radiation source (42) is disposed at one end of a support device (40), the X-ray detector device is disposed at the other end of the support device and is formed by the X-ray detector device according to claim 1.

* * * * *